US012557943B2

(12) United States Patent
Kitano et al.

(10) Patent No.: US 12,557,943 B2
(45) Date of Patent: Feb. 24, 2026

(54) METHOD AND APPARATUS FOR PRODUCING INSTANT FRIED NOODLES

(71) Applicant: NISSIN FOODS HOLDINGS CO., LTD., Osaka (JP)

(72) Inventors: Sho Kitano, Osaka (JP); Maiko Tanahashi, Osaka (JP); Takaaki Hibi, Osaka (JP); Yasuhiro Higashida, Osaka (JP); Koji Hayakawa, Osaka (JP); Taisuke Shingai, Osaka (JP); Hideki Takizawa, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 789 days.

(21) Appl. No.: 17/933,319

(22) Filed: Sep. 19, 2022

(65) Prior Publication Data

US 2023/0029199 A1     Jan. 26, 2023

Related U.S. Application Data

(62) Division of application No. 15/761,741, filed as application No. PCT/JP2017/006513 on Feb. 22, 2017, now Pat. No. 11,490,642.

(30) Foreign Application Priority Data

| Mar. 9, 2016 | (JP) | 2016-045223 |
| Mar. 9, 2016 | (JP) | 2016-045252 |
| Feb. 16, 2017 | (JP) | 2017-026610 |

(51) Int. Cl.
    *A47J 37/12*      (2006.01)
(52) U.S. Cl.
    CPC ....... *A47J 37/1214* (2013.01); *A47J 37/1266* (2013.01)

(58) Field of Classification Search
    CPC . A47J 37/1214; A47J 37/1233; A47J 37/1266
        (Continued)

(56) References Cited

U.S. PATENT DOCUMENTS

| 4,020,189 A | 4/1977 | Wright |
| 4,166,139 A | 8/1979 | Ishida |
        (Continued)

FOREIGN PATENT DOCUMENTS

| JP | 50-004269 | 1/1975 |
| JP | 50-038693 | 12/1975 |
        (Continued)

OTHER PUBLICATIONS

Japanese Information Offer 2016-045223, Apr. 2, 2019, 2 pages.
        (Continued)

*Primary Examiner* — Reginald Alexander
(74) *Attorney, Agent, or Firm* — HSML P.C.

(57)     ABSTRACT

Frying is performed in two stages so as to dip a retainer in frying oil at a prescribed dipping ratio and then to dip the whole of the retainer in the frying oil, and in addition, flow rates of the frying oil supplied from an upstream side and a downstream side of a frying oil tank and a surface level of the frying oil are controlled. Therefore, a noodle lump can be prevented from peeling off and floating from the bottom of the retainer before fixing the shape of the noodle lump due to a pressure applied by the frying oil so as not to impair the shape of the noodle lump, and as a result, frying efficiency or production efficiency can be improved. Besides, a noodle lump that has a very small number of coarse or dense portions in a distribution of noodle strings can be stably produced.

3 Claims, 7 Drawing Sheets

(58) Field of Classification Search
USPC .......................................... 99/405, 406, 404
See application file for complete search history.

(56)                    References Cited

U.S. PATENT DOCUMENTS

| | | | | |
|---|---|---|---|---|
| 4,185,125 A | | 1/1980 | Sakakibara et al. | |
| 4,234,612 A | * | 11/1980 | Sakakibara ......... | A47J 37/1214 99/404 |
| 4,254,696 A | | 3/1981 | Ohtake | |
| 4,489,646 A | * | 12/1984 | Schmidt .............. | A47J 37/1233 99/356 |
| 4,706,557 A | | 11/1987 | Feng et al. | |
| 4,882,984 A | * | 11/1989 | Eves, II .............. | A47J 37/1214 99/406 |
| 5,137,740 A | * | 8/1992 | Benson ............... | A47J 37/1214 426/438 |
| 2016/0157675 A1 | * | 6/2016 | Gvozdanovic ...... | A47J 37/1214 99/330 |
| 2016/0249654 A1 | | 9/2016 | Tanahashi et al. | |

FOREIGN PATENT DOCUMENTS

| | | | | |
|---|---|---|---|---|
| JP | 53-015471 | 2/1978 | | |
| JP | 53-032170 | 3/1978 | | |
| JP | 53-034941 | 3/1978 | | |
| JP | 53-050350 | 5/1978 | | |
| JP | 53-099373 | 8/1978 | | |
| JP | S53-142570 | 12/1978 | | |
| JP | 56-018826 | 2/1981 | | |
| JP | 56-111925 | 8/1981 | | |
| JP | 57-125723 | 8/1982 | | |
| JP | 58-023757 | 2/1983 | | |
| JP | 60-029117 | 2/1985 | | |
| JP | 61-247350 | 11/1986 | | |
| JP | 5-328923 | 12/1993 | | |
| JP | 5328923 A | * | 12/1993 | .......... A47J 37/1214 |
| JP | 11-221036 | 8/1999 | | |
| JP | 2004-229906 | 8/2004 | | |
| WO | WO-2013153956 A1 | * | 10/2013 | ............. A23L 7/113 |
| WO | 2015/053350 | 4/2015 | | |

OTHER PUBLICATIONS

Office Action issued in corresponding Japanese Patent Application No. JP2016-045252, Apr. 9, 2019, 12 pages Including translation.
Office Action issued in corresponding Japanese Patent Application No. JP2016-045223, Apr. 9, 2019, 11 pages Including translation.
Japanese Information Offer 2016-045252, Apr. 2, 2019, 2 pages.
Extended European Search Report issued in corresponding European Patent Application No. 17762914.4, Jul. 19, 2019, 9 pages.

* cited by examiner

CONTAINER
(OPENING)

UPPER SIDE
PORTION

LATERAL SIDE
PORTION

UNDERSIDE
PORTION

CONTAINER (BOTTOM)

METHOD AND APPARATUS FOR PRODUCING INSTANT FRIED NOODLES

TECHNICAL FIELD

The present invention relates to a noodle lump having a small number of coarse or dense portions and homogeneously fried, and a method and an apparatus for producing the same.

BACKGROUND ART

Instant noodles are processed food products that are preservable for a long period at ordinary temperature, are easily cooked and are inexpensively available. In particular, instant noodles prepacked in a container can be made edible by merely pouring boiling water into the container, and hence are useful in a variety of scenes.

In many of instant noodles currently prepacked in cup-shaped containers, a noodle lump has a flat and dense upper side, and has a coarse lower portion in general (Patent Literature 1).

In a method for producing snack noodles in a container disclosed in Patent Literature 1, a cup-shaped metal mold (a retainer) having a lateral side with small holes and a mesh bottom is filled with noodle strings. The retainer is lidded and then dipped in frying oil. Consequently, noodle strings float when moisture contained in the noodle strings evaporates, the upper side becomes flat because it comes into close contact with the lid, and thus a noodle lump having a dense upper side and a coarse lower portion can be shaped.

Since the noodle lump has a flat and dense upper side in this manner, when ingredients such as dried vegetables are added, the ingredients do not enter into the noodle lump but are reconstituted on the noodles to eat, which brings an excellent effect of increasing the appetite.

CITATION LIST

Patent Literature

Patent Literature 1: Japanese Patent Publication No. 50-38693

SUMMARY OF INVENTION

Technical Problem

If the whole lidded retainer filled with the noodle strings is dipped in the frying oil at a time, however, a group of noodle strings floats and is collected in the vicinity of the lid when the frying oil blows up, and hence there arises a problem that a dense portion of the noodle strings is poorly coated with the oil.

Solution to Problem

The inventors of the present invention have earnestly studied a method for drying by frying a group of noodle strings held in a retainer efficiently and homogeneously while the retainer is being conveyed, resulting in finding: (1) When the retainer is dipped in the frying oil at a prescribed dipping ratio (hereinafter, which operation is designated as the "half frying"), a part of a group of noodle strings dipped in the frying oil adheres to a bottom of the retainer; (2) the frying oil blows up through evaporation of moisture from the noodle strings dipped in the frying oil, and hence the group of the noodle strings swells upward as a whole; (3) the group of the noodle strings having swollen upward is partially fried by the frying oil blowing up; and (4) when the whole retainer is dipped in the frying oil (hereinafter, which operation is designated as the "deep frying") after steps (1) to (3), the shape of a noodle lump bulked up through the swell is fixed, and hence the frying oil is well coated among the noodle strings, and thus, the noodle lump can be efficiently produced.

Besides, when a flow rate of the frying oil supplied to an upstream portion of a frying oil tank is set to be smaller than a flow rate of the frying oil supplied to a downstream portion of the frying oil tank, particularly when the flow rate of the frying oil supplied to the upstream portion of the frying oil tank is set to be 90% or less of the flow rate of the frying oil supplied to the downstream portion of the frying oil tank, the shape of the noodle lump is not impaired by resistance caused by the flow of the frying oil, and hence a noodle lump having an extremely small number of coarse or dense portions in a distribution of noodle strings can be produced, resulting in accomplishing the present invention.

Specifically, the present invention provides a method for producing a dried noodle lump of instant fried noodles described below.

Item 1. A method for producing a fried noodle lump by dipping, in frying oil held in a frying oil tank, a retainer holding a group of noodle strings having been gelatinized, including: a first step of conveying the retainer with a part of the group of noodle strings dipped in the frying oil held in the frying oil tank; and a second step, following the first step, of conveying the retainer with the whole of the group of noodle strings dipped in the frying oil held in the frying oil tank, in which a flow rate of the frying oil supplied to an upstream portion of the frying oil tank is 90% or less of a flow rate of the frying oil supplied to a downstream portion of the frying oil tank.

Item 2. The method for producing a fried noodle lump according to Item 1, in which a dipping ratio of the group of noodle strings in the frying oil in the first step is 10% to 70%.

Item 3. The method for producing a fried noodle lump according to Item 1, in which a surface level of the frying oil in the upstream portion of the frying oil tank is lower than a surface level in the downstream portion of the frying oil tank.

Item 4. The method for producing a fried noodle lump according to Item 1, wherein a supply amount of the frying oil to be supplied to the frying oil tank is controlled based on a surface level of the frying oil in a region of the frying oil tank where the first step is carried out.

Then, the present invention provides an apparatus for producing a dried noodle lump of instant fried noodles described below.

Item 5. An apparatus for producing a fried noodle lump, including: a frying oil tank; a noodle string supplying mechanism disposed upstream from the frying oil tank, and charging a group of noodle strings to a retainer; a noodle string group frying and conveying mechanism conveying the group of noodle strings with the retainer partly dipped in frying oil in a first region of the frying oil tank, and subsequently conveying the group of noodle strings with the retainer dipped below a surface level of the frying oil in a second region of the frying oil tank; a frying oil circulating mechanism recovering the frying oil from the frying oil tank and supplying the frying oil heated again to the frying oil tank; and a frying oil flow rate controlling mechanism controlling flow rates of the frying oil supplied through a plurality of ejection ports provided in the frying oil tank, in which a flow rate of the frying oil supplied through an ejection port provided in an upstream portion of the frying oil tank is controlled to be smaller than a flow rate of the frying oil supplied through an ejection port provided in a downstream portion.

Item 6. The apparatus for producing a fried noodle lump according to Item 5, further including a surface level sensor measuring the surface level of the frying oil in the first region.

Item 7. The apparatus for producing a fried noodle lump according to Item 6, further including a fresh oil supplying mechanism controlling a supply amount of a fresh oil to be supplied to the frying oil circulating mechanism based on the surface level of the frying oil measured by the surface level sensor.

Item 8. The apparatus for producing a fried noodle lump according to Item 5, in which the frying oil tank further includes: a suction port recovering the frying oil to the frying oil circulating mechanism; and an extension plate disposed in at least one of the plurality of ejection ports for preventing the frying oil flowing in from directly hitting the retainer.

The present invention further provides a dried noodle lump of instant fried noodles described below.

Item 9. A dried noodle lump of instant fried noodles in a three-dimensional shape including an upper side portion, an underside portion and lateral side portions, in which the upper side portion is wider than the underside portion, and a difference in density of noodle strings between an upper half portion and a lower half portion of the dried noodle lump is 13% or less.

DESCRIPTION OF EMBODIMENT

Figure 1:
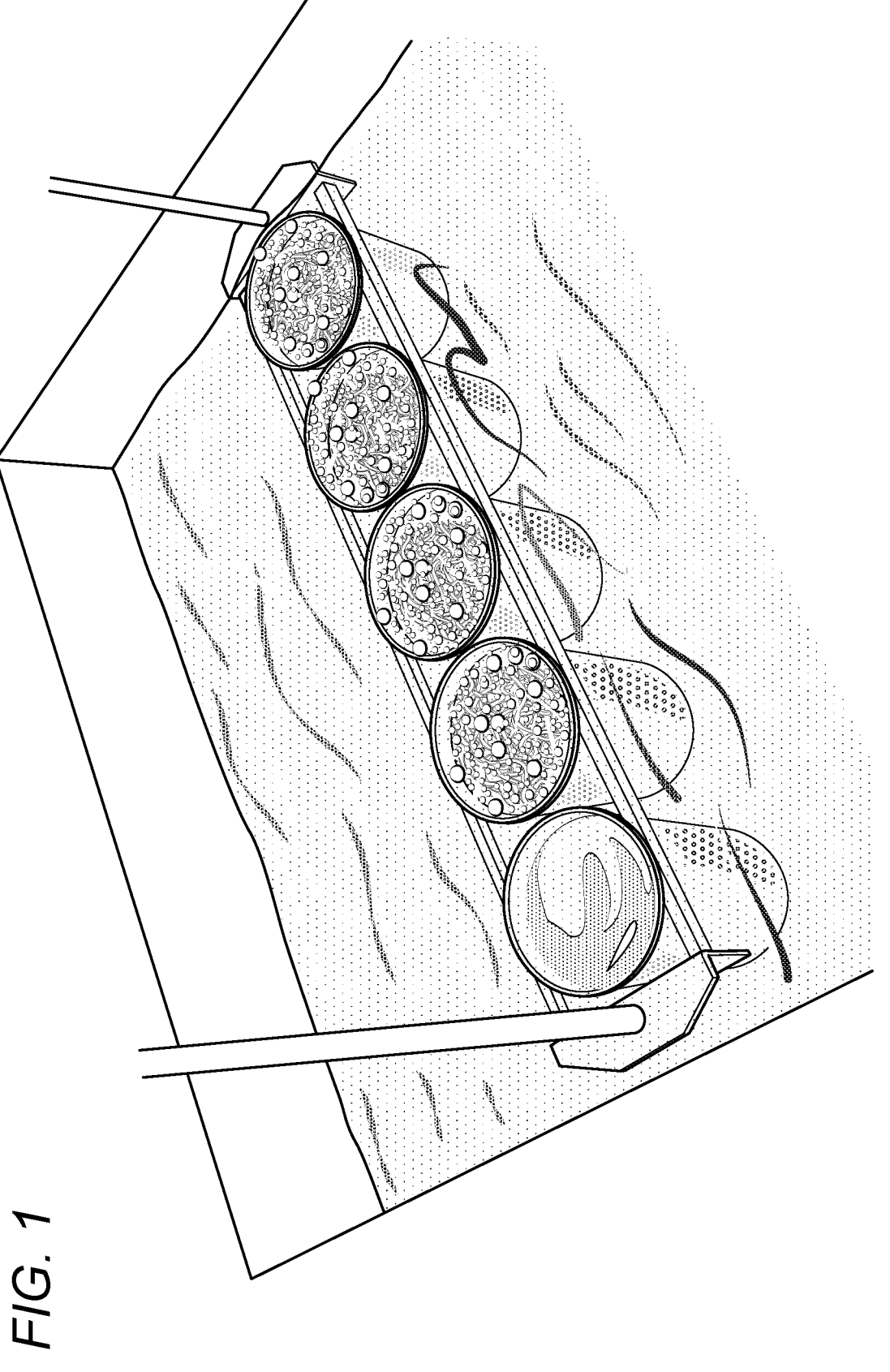
FIG. 1 is a view of groups of noodle strings held in a compact retainer being manually half fried.

Now, production steps of a fried noodle lump will be described. Incidentally, the type of instant fried noodles to be produced is not especially limited and may be any one of those usually known in the technical field. Examples include udon (wheat noodles), soba (buckwheat noodles), Chinese noodles, and pastas.

<Production Steps of Fried Noodle Lump>
1. Raw Material Formulation

As a raw material of the instant fried noodles, any of raw materials of usual instant noodles can be used. Specifically, as a raw material powder, a single one of or a mixture of flours such as a wheat flour, a buckwheat flour and a rice flour, and various starches such as a potato starch, a tapioca starch and a cornstarch, and modified starches of these may be used.

2. Preparation of Dough

A method for preparing a dough may be performed in accordance with an ordinary method. Specifically, a normal pressure mixer, a vacuum mixer or the like may be used for kneading, for homogeneously mixing, the noodle material powder and kneading water, and thus, a crumb-like dough may be prepared.

3. Preparation of Noodle Belt

The prepared dough is used for preparing a noodle belt. The noodle belt may be prepared in accordance with an ordinary method, and for example, the dough may be formed into a crude noodle belt usually using a shaping roller, and then formed into a noodle belt using a composite roller.

4. Rolling Out and Cutting

Subsequently, the prepared noodle belt is rolled out into a prescribed noodle thickness by using a roll-out roller. The noodle belt having the desired noodle thickness is cut with a cutting blade roller to obtain raw noodle strings.

5. Gelatinizing Step

Subsequently, the thus obtained raw noodle strings are gelatinized by steaming and/or boiling by an ordinary method. As a steaming method, not only heating with saturated water vapor but also heating with superheated water vapor can be employed.

6. Flavoring Step

The noodle strings thus gelatinized can be seasoned by causing a seasoning liquid (a flavoring liquid) to adhere thereto by spraying, dipping or the like. This flavoring step need not be always performed but may be omitted.

7. Cutting and Charging

Subsequently, the noodle strings are cut into a length of 20 to 50 cm corresponding to one meal amount, and are charged into each cup container of a retainer by a noodle string supplying mechanism. A filling ratio of a group of noodle strings in the retainer is preferably 90% or less. Here, the filling ratio refers to a value expressed in percentage obtained by dividing a height of the group of noodle strings by a height of the retainer.

8. Drying/Frying Step

A plurality of retainers are bridged between endless conveyance chains so as to perform a drying/frying treatment while the retainers are being conveyed. Examples of an edible oil to be used include palm oil and lard.

8.1. Prior Art

In the prior art, a retainer holding a group of noodle strings in each cup container of the retainer is dipped at a time in a frying oil tank filled with a heated frying oil, and is caused to pass therethrough horizontally at a prescribed speed for performing a frying treatment for a prescribed period of time.

8.2. Present Invention

In the present invention, a retainer is partially dipped in the frying oil under control of a flow rate of the frying oil supplied to a frying oil tank and control of a surface level of the frying oil as described later (which step is designated as a half frying step), and thereafter, the whole retainer is dipped at a time in the frying oil (which step is designated as a deep frying step), and thus, a fried noodle lump is prepared.

—Half Frying Step—

In the half frying step, the retainer is partially dipped in the heated frying oil held in the frying oil tank while the retainer is being moved, so as to perform a frying treatment of the group of noodle strings at a prescribed dipping ratio. Here, the dipping ratio of the group of noodle strings refers to a value expressed in percentage obtained by dividing a height from a bottom of the retainer to a surface level of the oil by a height of the group of noodle strings, and the dipping ratio of the retainer refers to a value expressed in percentage obtained by dividing the height from the bottom of the retainer to the surface level by a height of the retainer. When the whole of the group of noodle strings or the whole of the retainer is dipped in the frying oil, the dipping ratio of the group of noodle strings or the retainer is 100%.

FIG. 1 illustrates a photograph of how groups of noodle strings are held in a compact retainer and the groups of noodle strings are manually half fried without lid members for observing the half frying. When the retainer is dipped in the frying oil at a prescribed dipping ratio, the frying oil blows up through evaporation of moisture contained in the noodle strings dipped in the frying oil as illustrated in FIG. 1, and the groups of noodle strings swollen upward are partially fried by the frying oil blowing up.

—Deep Frying Step—

Figure 2:
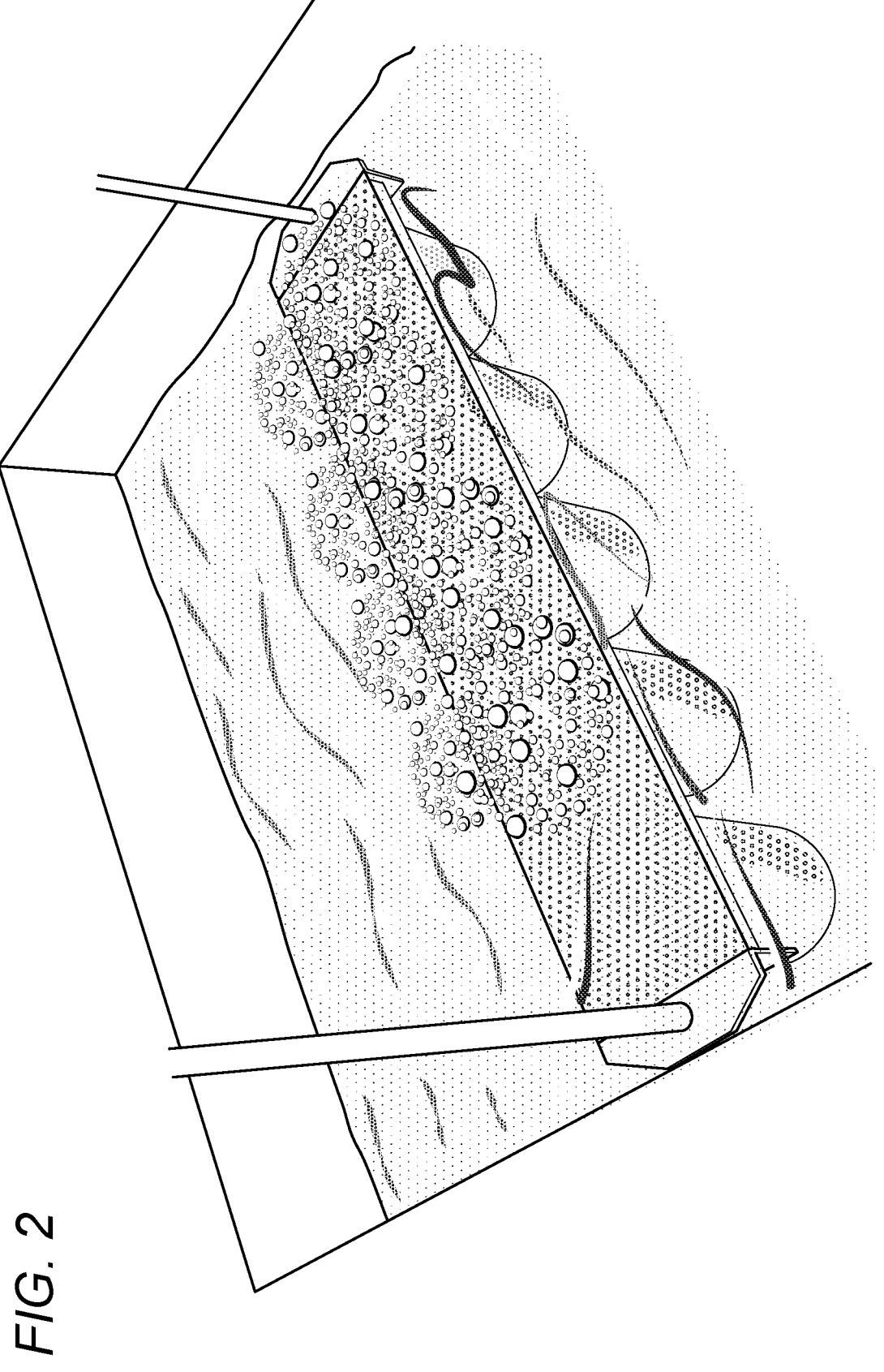
FIG. 2 is a view of groups of noodle strings held in a compact retainer being manually deep fried.

Subsequently to the half frying step, the deep frying step of frying the group of noodle strings by dipping the whole of the retainer in the frying oil is performed. FIG. 2 illustrates a photograph of how the compact retainer lidded with a metal lid having a large number of small holes with a diameter of 2.9 mm is manually deep fried after performing the half frying step of FIG. 1. When the retainer is dipped in a heated frying oil at a time without performing the half frying step as in the prior art, the group of noodle strings is fried after floating to the vicinity of the lid, and an upper side of a resultant noodle lump becomes flat because it comes into close contact with the lid, and in addition, the noodle lump becomes dense in an upper portion and coarse in a lower portion. On the other hand, in the production method of the present invention, since the half frying step causes the group of noodle strings to adhere to a bottom of the retainer, and in addition, the group of noodle strings can be bulked, improvement can be made to cause the frying oil to coat among the noodle strings.

The dipping ratio of the group of noodle strings in the half frying is preferably set to fall in a range in which the whole group of noodle strings is swollen upward by the frying oil blowing up through the evaporation of the moisture contained in the group of noodle strings with a part of the thus fried group of noodle strings caused to adhere to the bottom of the retainer, and in addition, the thus swollen group of noodle strings can be partially fried by the frying oil blowing up. Besides, a frying time of the half frying is preferably in a range of 10 seconds to 30 seconds, and a frying time of the deep frying is preferably a time duration (of, for example, 100 seconds to 130 seconds) after which a moisture content can become 5% or less.

9. Cooling Step

After the drying by frying, the lid is removed, and the noodle lump is taken out of the container. The noodle lump taken out is cooled for a prescribed period of time to obtain instant fried noodles.

10. Another Step

The cooled instant fried noodles are transferred to a packaging step to be packaged in a cup or a bag together with a soup and other ingredients, and the resultant is sold as an instant fried noodle product.

<Apparatus for Producing Fried Noodle Lump>

Figure 3:
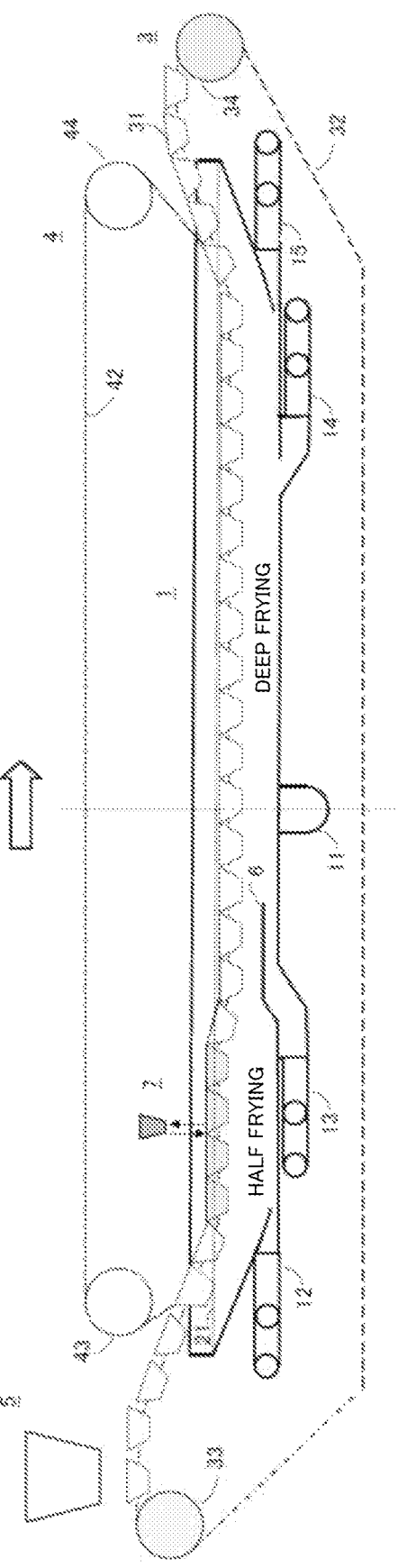
FIG. 3 is a schematic lateral side view of an apparatus for producing a fried noodle lump used for practicing the present invention.
Figure 4:
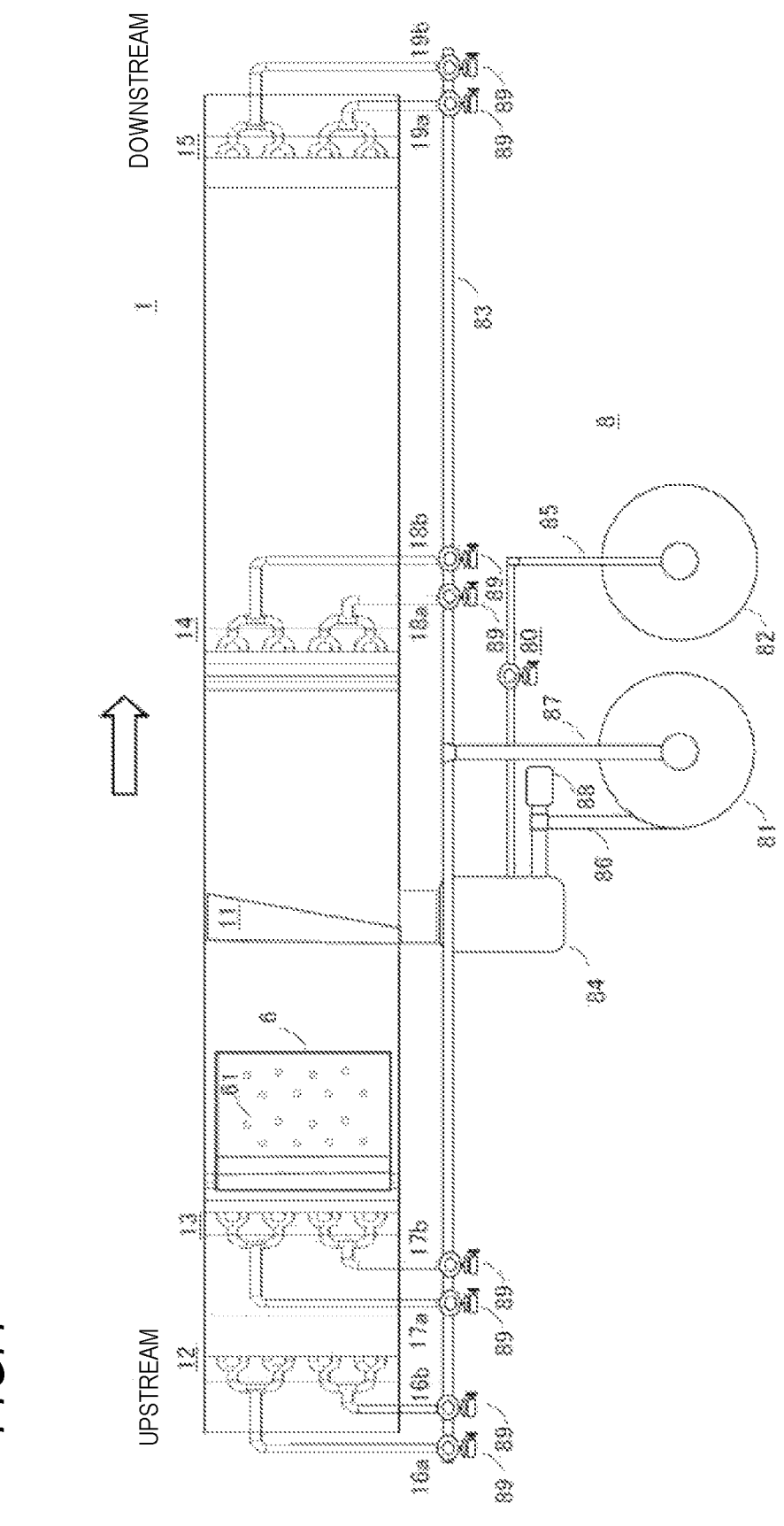
FIG. 4 is a schematic upper side view of the apparatus for producing a fried noodle lump used for practicing the present invention.

FIG. 3 and FIG. 4 illustrate an example of an apparatus used for producing a fried noodle lump for practicing the production method of the present invention. Now, the apparatus for producing a fried noodle lump, and the control of a flow rate of frying oil and the control of the surface level of the frying oil will be described.

The apparatus for producing a fried noodle lump according to the present invention includes: a frying oil tank 1; frying oil 2 poured into the frying oil tank 1; retainers 31 each including a plurality of cup-shaped containers each capable of holding a group of noodle strings 9 therein; a retainer conveyor 3 corresponding to an endless conveyor on which the retainers 31 are attached; a retainer lid conveyor 4 corresponding to an endless conveyor on which retainer lids 41 not shown are attached so as to cover from above each cup-shaped container of the retainers 31 after the group of noodle strings 9 to be fried is held in the cup-shaped container by a noodle string supplying mechanism 5 and before the retainer enters the frying oil; sprockets 33 and 34, and 43 and 44 around which conveyance chains 32 and 42 are respectively wound for allowing the respective conveyors to work; a drive motor not shown for transmitting driving force to the sprockets; a surface level sensor 7 for measuring a surface level of the frying oil 2 in the frying oil tank 1; a frying oil circulating mechanism 8 for recovering the frying oil 2 of the frying oil tank 1 and supplying the frying oil heated again to the frying oil tank 1; a fresh oil supplying mechanism not shown for controlling a supply amount of fresh oil to be supplied to the frying oil circulating mechanism; a frying oil supply controlling mechanism for controlling a flow rate of the frying oil to be supplied through each ejection port; and an oil supplying tank.

The retainer conveyor 3 includes the endless conveyance chains 32 on which the retainers 31 are successively disposed, and is constructed so that a group of noodle strings 9 can be fried in two stages. The conveyance chains 32 are wound between the first sprocket 33 and the second sprocket 34, and are driven by a drive motor not shown. Besides, the retainer conveyor circularly runs clockwise with upper running tracks of the conveyance chains used as a forward conveyance path and with lower running tracks thereof used as a backward conveyance path.

Incidentally, the conveyance chains 32 and the sprockets 33 and 34 are paired and spaced from each other in a width direction of the retainer conveyor 3, and the plural retainers 31 are bridged between the pair of conveyance chains 32. Besides, on each retainer 31, a plurality of fluid permeable cup-shaped containers are disposed.

In the apparatus for producing a fried noodle lump of the present invention, the retainer 31 including the cup-shaped containers holding the groups of noodle strings 9 supplied from the noodle string supplying mechanism 5 is conveyed in a diagonally downward direction in the forward conveyance path, has openings of the cup-shaped containers covered with the retainer lids 41 not shown, and then enters the frying oil tank 1 filled with the frying oil. Then, the retainer 31 passes horizontally through the frying oil while the groups of noodle strings 9 held in the respective cup-shaped containers are being dipped in the frying oil in the frying oil tank 1 at a prescribed dipping ratio. This step is designated as the half frying step.

After the half frying step, the retainer 31 moves further in the diagonally downward direction, and passes horizontally through the frying oil in the frying oil tank 1 while the whole of the retainer 31 is being completely dipped in the frying oil. This step is designated as the deep frying step. Here, in transition from the half frying to the deep frying, the inclination of the retainer conveyor 3 is preferably 7° to 9°.

After the deep frying, the retainer 31 is pulled up in a diagonally upward direction from the frying oil tank 1, and is inverted to run through the backward path after noodle lumps are taken out from the cup-shaped containers. Since the conveyance chains 32 are disposed to surround the frying oil tank 1, the retainer runs below the frying oil tank 1 as the backward conveyance path.

Incidentally, the frying times of the half frying and the deep frying are determined depending on a length in a longitudinal direction of the frying oil tank and a conveyance speed of the retainer 31 employed in the respective steps.

The retainer lid conveyor 4 is constructed so that the openings of the cup-shaped containers can be covered with the retainer lids 41 after the groups of noodle strings to be fried are held in the cup-shaped containers of the retainer 31.

In the retainer lid conveyor 4, a plurality of retainer lids 41 are disposed on the endless conveyance chains 42. The conveyance chains 42 are wound between the third sprocket 43 and the fourth sprocket 44, and are driven by the drive motor not shown of the retainer conveyor 3 so as to be tuned with the retainer conveyor 3. Besides, the retainer lid conveyor circularly runs counterclockwise with upper running tracks of the conveyance chains 42 used as a forward conveyance path and with lower running tracks thereof used as a backward conveyance path.

Each retainer lid 41 has a plurality of holes for obtaining fluid permeability.

On a bottom portion in the center in the longitudinal direction of the frying oil tank 1, a suction port 11 for recovering the frying oil into the frying oil circulating mechanism 8 is provided, and on an upstream side from the suction port 11 (i.e., a side where the retainer 31 enters the frying oil) and a downstream side (i.e., a side where the retainer 31 is pulled up from the frying oil), two ejection ports for supplying the heated frying oil from the frying oil circulating mechanism 8 are respectively provided. In order to prevent a group of fried noodles from being insufficiently fried, at least one ejection port is preferably provided on each of the upstream and downstream sides. Besides, as illustrated in FIG. 4, each of the ejection ports 12 to 15 includes eight openings, but the number of openings can be appropriately selected.

The suction port 11 is in a tapered shape having an opening width gradually narrowed in a sucking direction (i.e., a direction connected to a strainer 84 for removing foreign matters). Thus, the frying oil can be sucked without causing an unnecessary swirling current in the frying oil tank 1. Besides, since the suction port 11 extends in the width direction of the frying oil tank 1, the frying oil supplied through the ejection ports 14 and 15 disposed on the downstream side can be prevented from flowing to the upstream side beyond the suction port 11 so as not to peel a noodle lump adhering onto the bottom of the retainer by resistance caused by the flow and to impair the shape of the noodle lump not fixed.

The frying oil circulating mechanism 8 includes: the strainer 84 for recovering the frying oil through the suction port 11 to remove foreign matters therefrom; a heat exchanger 81 for heating the frying oil flowing from the strainer 84 through a heat exchanger frying oil recovering pipe 86; a heat exchanger frying oil supplying pipe 87 for supplying the heated frying oil from the heat exchanger 81 to the respective ejection ports; a frying oil common supplying pipe 83; valves 89 for controlling a flow rate of the frying oil supplied from the frying oil common supplying pipe 83 to each ejection port; a fresh oil tank 82 storing the fresh oil; and a fresh oil supplying pipe 85 for supplying the fresh oil to the heat exchanger 81 through the strainer 84. Incidentally, the fresh oil is mixed with the recovered frying oil to be heated in the heat exchanger 81. Besides, a supply amount of the fresh oil is controlled by a proportional valve 80.

Furthermore, the apparatus for producing a fried noodle lump of the present invention is constructed so that the flow rate of the frying oil supplied to the frying oil tank 1 through each of the ejection ports can be changed by controlling the opening ratios of respective valves 89 by a frying oil flow controlling mechanism not shown.

At this point, the opening ratios of the respective valves 89 are controlled so that the flow rate of the frying oil supplied to an upstream portion of the frying oil tank can be lower than that to a downstream portion. In machine production of a fried noodle lump, a retainer holding a group of noodle strings is dipped in the frying oil while being conveyed, and therefore, resistance of the frying oil is easily applied to the group of noodle strings. When the flow rate of the frying oil supplied from the ejection port provided in the upstream portion of the frying oil tank is controlled to be lower than the flow rate from the ejection port provided in the downstream portion, the noodle lump can be prevented from peeling off and floating from the bottom of the retainer before fixing the shape of the noodle lump due to a pressure applied by the frying oil, so as not to impair the shape of the noodle lump, and as a result, frying efficiency or production efficiency can be improved.

Specifically, assuming that a total flow rate per unit time of the frying oil supplied to the frying oil tank through the ejection ports provided in the downstream portion is 1, a total flow rate per unit time through the ejection ports provided in the upstream portion is preferably 0.9 or less, and more preferably 0.85 or less.

When the flow rates of the frying oil supplied to the upstream portion and the downstream portion of the frying oil tank are controlled as described above, an average temperature of the frying oil in the upstream portion is lower by 10° C. to 35° C. than an average temperature of the frying oil in the downstream portion.

Besides, when the flow rate of the frying oil supplied to the upstream portion of the frying oil tank is set to be lower than that to the downstream portion as described above, the surface level of the oil is lower in the upstream portion than in the downstream portion even in the same frying oil tank.

In the apparatus for producing a fried noodle lump of the present invention, the whole supply amount of the frying oil supplied to the frying oil tank can be controlled not only by the control of the flow rate of the frying oil supplied through each ejection port but also by the control of the surface level of the frying oil.

In order to control the whole supply amount of the frying oil to the frying oil tank 1, at least one surface level sensor 7 is provided in a first region where the half frying is carried out. The surface level sensor 7 can be any sensor as long as it is a liquid level sensor capable of measuring variation in surface level, and preferably has a function for detecting the variation in surface level with accuracy in millimeters, and for example, a guide pulse level sensor can be used.

Since a part of the frying oil is absorbed by noodle lumps, the amount of the frying oil held in the frying oil tank 1 reduces as the production proceeds. In production of fried noodles of the prior art, the variation in surface level of the frying oil does not cause any serious problem, but the dipping ratio of a group of noodle strings in the frying oil in the half frying largely affects the frying efficiency and the shape of a resultant noodle lump. Therefore, the apparatus for producing a fried noodle lump of the present invention is provided with the surface level sensor 7 in the first region where the half frying is carried out, and includes the fresh oil supplying mechanism for feedback controlling, with the proportional valve, the amount of the fresh oil supplied from the fresh oil tank 82 to the strainer 84 so as to restrict the variation in surface level within a prescribed range. Incidentally, from the viewpoint of stability of the shape of a noodle lump, the range of the variation in surface level is ±5 mm or less, and preferably ±3 mm or less.

As described above, since the surface level is measured in the first region where the half frying is carried out so as to control the supply amount of the fresh oil using the proportional valve 80 in accordance with the measurement result, the variation in surface level in the first region where the half frying is carried out can be minimized, and the dipping ratio of a group of noodle strings suitable for obtaining good frying efficiency can be stably obtained in the machine production.

In the apparatus for producing a fried noodle lump of the present invention, an extension plate 6 including a plurality of holes 61 may be further provided in the second ejection port 13. When the heated frying oil moves upward by convection from the ejection port toward a retainer body 31, the noodle lump adhering to the bottom of the cup-shaped container of the retainer body 31 may be released and float, so that the shape of the noodle lump may be impaired in some cases. This is likely to happen when the shape of the noodle lump has not been fixed yet and immediately after the noodle lump has transited to the deep frying from the half frying where the retainer body 31 is close to the ejection port. Therefore, in the apparatus for producing a fried noodle lump of the present invention, the second ejection port 13 provided in a region immediately after the transition from the half frying to the deep frying is provided with the extension plate 6, and thus, the heated frying oil is prevented from directly hitting the retainer body 31.

Besides, the frying oil supplied from the frying oil circulating mechanism includes a large number of bubbles, and large bubbles can be a cause for causing the noodle lump to peel off and float from the bottom of the cup-shaped container. Since the extension plate 6 is provided with a plurality of holes 61, the diameter of a bubble can be reduced, so that a large bubble can be avoided from directly hitting the retainer body 31.

Besides, in the apparatus for producing a fried noodle lump of the present invention, prescribed voids are provided respectively between right and left lateral sides of the extension plate 6 and inner lateral sides of the frying oil tank. Each void preferably has a width of 5 cm to 15 cm. Since the voids through which the frying oil can be distributed are provided on the left and right sides of the extension plate 6, above which the retainer body 31 does not have a cup-shaped container, the flow of the frying oil supplied through the second ejection port 13 can be prevented from being collected on the retainer body 31.

In this manner, according to the present invention, a group of noodle strings is fried under control of the flow rate of the frying oil supplied through each ejection port of the frying oil tank and control of the surface level for controlling the whole supply amount of the frying oil, and besides, the extension plate is provided on the ejection port of the frying oil so that the frying oil cannot directly hit the retainer immediately after the half frying, and therefore, a noodle lump can be prevented from peeling off and floating from the bottom of a retainer before fixing the shape of the noodle lump so as not to impair the shape of the noodle lump, and as a result, frying efficiency or production efficiency can be improved. Besides, a noodle lump that has a very small difference in density of noodle strings between an upper portion and a lower portion and is homogeneously fried can be obtained.

EXAMPLES

The present embodiment will now be described in more detail with reference to examples.

Experiment 1

In Experiment 1, in order to verify an optimal dipping ratio of a retainer (dipping ratio of a group of noodle strings) in the half frying of the present invention, a hundred fried noodle lumps were produced under condition of a dipping ratio of the retainer of 15%, 35%, 55% or 75% (corresponding respectively to a dipping ratio of a group of noodle strings of 12.75%, 29.75%, 46.75% or 63.75%) (Examples 1-1 to 1-4). Besides, a fried noodle lump was produced by a production method of the prior art in which the half frying is not performed but the deep frying alone is performed (Comparative Example 1).

Example 1-1

Nine hundred (900) g of wheat flour and 100 g of starch were mixed to obtain a powder mixture, 15 g of salt, 2.3 g of kansui, and 340 ml of kneading water containing 0.4 g of polyphosphate dissolved therein were added to the powder mixture, and the resultant was kneaded with a normal pressure twin-screw mixer for 3 minutes to prepare a crumb-like dough. At this point, the dough had a moisture content of 35.0%.

The thus prepared dough was prepared into a crude noodle belt under normal pressure using a usual shaping roller, and two crude noodle belts were composited into a noodle belt using a shaping roller again. At this point, the noodle belt had a thickness of 12 mm.

The resultant was rolled out six times using a roll-out roller, and the thus rolled out noodle belt was cut into noodle strings using a #20 square cutting blade roller.

The thus cut noodle strings were immediately steamed for 2 minutes in a steam chamber to which saturated water vapor was supplied at 240 kg/h.

The steamed noodle strings were dipped for 5 seconds in a flavoring liquid in which 90 g of salt, 13.5 g of glutamic acid, 10 ml of soy sauce and 30 g of a meat extract were dissolved per L, and then the resultant noodle strings were cut into a length of 30 cm when stretched. In this manner, noodle strings in an amount necessary for producing twelve noodle lumps can be obtained.

Subsequently, in the apparatus for producing a fried noodle lump of the present invention illustrated in FIG. 3, 101 g of a group of noodle strings thus cut was filled in each cup container of the retainer 31 at a filling ratio of 85% by the noodle string supplying mechanism 5, and the half frying and the deep frying were performed while the retainer 31 was being conveyed at a conveyance speed of 4 m/min. The frying times of the half frying and the deep frying were respectively 20 seconds and 120 seconds. Besides, the dipping ratio of the retainer in the half frying was 15% (corresponding to the dipping ratio of the group of noodle strings of 12.75%).

The used retainer had the cup containers each in the shape of a cup having a topside diameter of 92 mm, an underside diameter of 74.1 mm, and a height of 50.7 mm, and each having a large number of small holes with a diameter of 2.9 mm on the bottom. Besides, a metal lid having a large number of small holes with a diameter of 2.9 mm was used as the retainer lid 41.

To the frying oil tank 1, the frying oil heated to 150° C. was supplied through the first ejection port 12 to the fourth ejection port 15, and an average flow rate of the frying oil supplied to the whole frying oil tank was set to 250 m³/h. Besides, an allowable range of the variation in surface level in the region where the half frying was carried out was set to ±3 mm.

Furthermore, an average flow rate of the frying oil supplied through the first ejection port 12 and the second ejection port 13 provided in the upstream portion of the frying oil tank 1 was set to 52 m³/h, and an average flow rate of the frying oil supplied through the third ejection port 14 and the fourth ejection port 15 provided in the downstream portion of the frying oil tank 1 was set to 73 m³/h. In this case, a flow rate ratio between the upstream portion and the downstream portion is 71.2%.

Example 1-2

A fried noodle lump was prepared under the same conditions as in Example 1-1 except that the dipping ratio of the retainer in the half frying was set to 35% (corresponding to the dipping ratio of the group of noodle strings of 29.75%).

Example 1-3

A fried noodle lump was prepared under the same conditions as in Example 1-1 except that the dipping ratio of the retainer in the half frying was set to 55% (corresponding to the dipping ratio of the group of noodle strings of 46.75%).

Example 1-4

A fried noodle lump was prepared under the same conditions as in Example 1-1 except that the dipping ratio of the retainer in the half frying was set to 75% (corresponding to the dipping ratio of the group of noodle strings of 63.75%).

Comparative Example 1

A fried noodle lump was prepared under the same conditions as in Example 1-1 except that the deep frying alone was performed for 140 seconds without performing the half frying, and that the supply amount of the frying oil supplied to the frying oil tank was controlled so that average flow rates of the frying oil supplied through the first ejection port to the fourth ejection port of the frying oil tank could be all set to 62.5 m³/h, namely, a flow rate ratio between the upstream portion and the downstream portion could be 100%. It is noted that a conventional apparatus for producing a fried noodle lump for performing the deep frying in all the steps was used in Comparative Example 1.

<Evaluation Results of Experiment 1>

Figure 5:
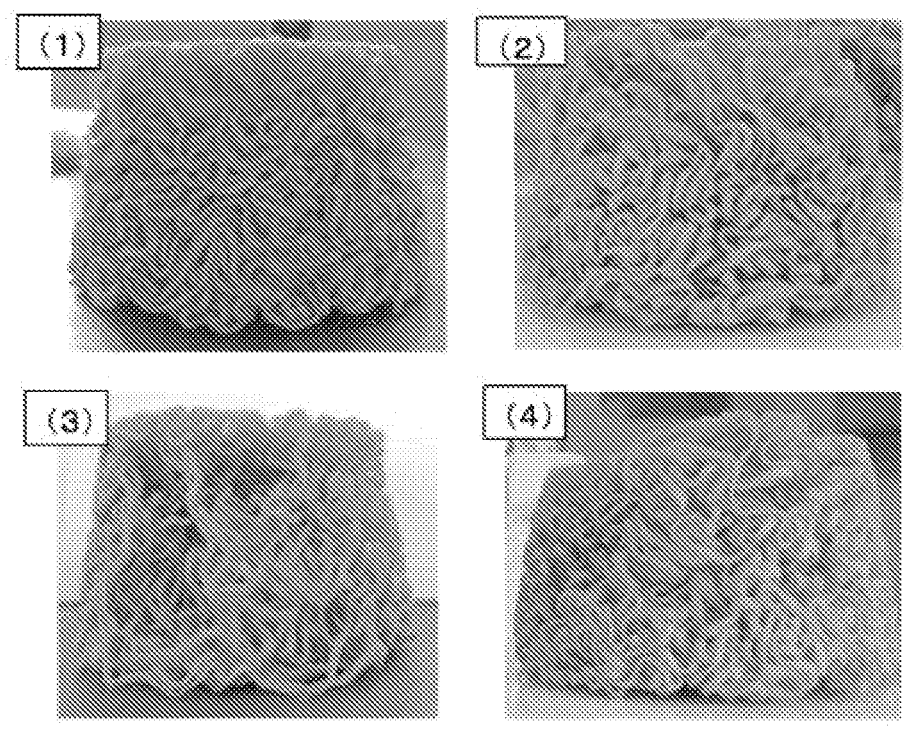
FIG. 5 illustrates photographs of exemplified samples of fried noodle lumps.
Figure 6:
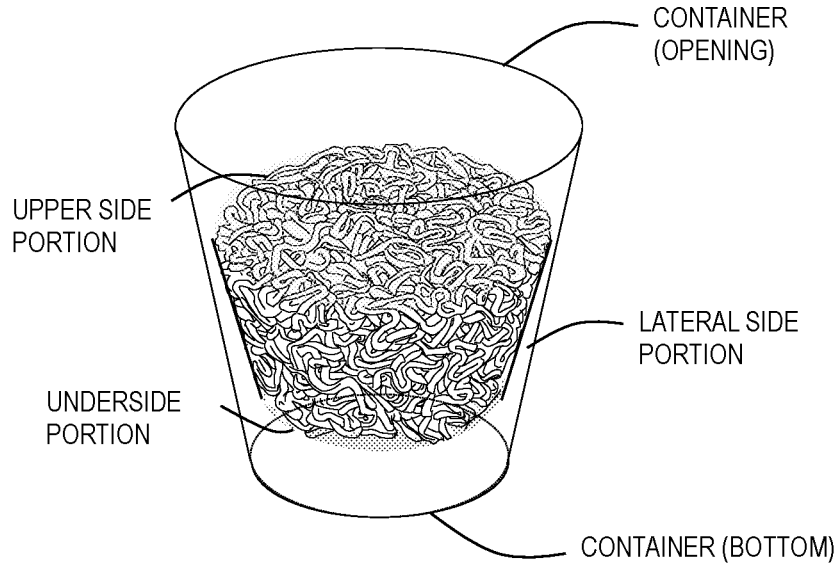
FIG. 6 is a schematic diagram of a fried noodle lump held in a cup container.

The states of the noodle lump samples experimentally produced in Experiment 1 were divided into a state (1) in which noodle strings were homogeneously distributed without coarseness and denseness, a state (2) in which noodle strings were coarsely or densely distributed, a state (3) in which a density of noodle strings was lower in the center of the noodle lump, and a state (4) in which the noodle lump had underside slide (inclination), and the number of each state was counted to express the number in percentage as shown in Table 1. FIG. 5 illustrates examples of the noodle lump samples respectively in the states (1) to (4).

TABLE 1

| | Dipping Ratio (%) | | State of Noodle Lump | | | |
|---|---|---|---|---|---|---|
| Example | Retainer | Noodle String | (1) | (2) | (3) | (4) |
| Example 1-1 | 15 | 12.75 | 70% | 2% | 25% | 3% |
| Example 1-2 | 35 | 29.75 | 90% | 2% | 4% | 4% |
| Example 1-3 | 55 | 46.75 | 85% | 10% | 0% | 5% |
| Example 1-4 | 75 | 63.75 | 60% | 25% | 0% | 15% |
| Comparative Example 1 | 100 | 100 | 0% | 100% | 0% | 0% |

In Example 1-1 in which the dipping ratio of a group of noodle strings was low, a noodle lump in the state (1) in which the noodle strings were homogeneously distributed without coarseness and denseness could be obtained in 70% of the samples, but a noodle lump in the state (3) in which the density of the noodle strings was lower in the center of the noodle lump was obtained in comparatively large number of samples of 25%. This is probably for the following reason: when the dipping ratio of a group of noodle strings in the frying oil is low, a layer of the group of noodle strings fried in the half frying is thin, and hence, the layer of the group of noodle strings not fixed yet is pulled to extend upward due to the convection of the frying oil in the deep frying.

On the other hand, in Examples 1-2 and 1-3 in which the dipping ratio of the retainer was set respectively to 35% and 55%, a noodle lump in the state (1) in which the noodle strings were homogeneously distributed without coarseness and denseness could be obtained respectively in 90% and 85% of the samples. This is probably for the following reason: (i) a part of the group of noodle strings adheres to the bottom of the retainer in the half frying, and after the whole of the group of noodle strings swells upward, the thus bulked shape of the noodle lump obtained by the swell can be fixed in the deep frying; and (ii) since the average flow rate of the frying oil supplied through the first ejection port 12 and the second ejection port 13 provided in the upstream portion of the frying oil tank 1 is set to be lower than the average flow rate of the frying oil supplied through the third ejection port 14 and the fourth ejection port 15 provided in the downstream portion of the frying oil tank 1, the noodle lump can be prevented from peeling off and floating from the bottom of the cup container of the retainer by resistance caused by the flow of the frying oil in the half frying before fixing the shape, so as not to collide against the retainer lid.

On the other hand, in Example 1-4 in which the dipping ratio of the retainer was set to 75%, a proportion of a noodle lump in the state (1) in which the noodle strings were homogeneously distributed without coarseness and denseness was as low as 60%, a proportion of a noodle lump in the state (2) in which the noodle strings were coarsely or densely distributed was increased to 25%, and a proportion of a noodle lump in the state (4) in which the noodle lump had underside slide (inclination) was increased to 15%. This is probably because when the dipping ratio of the retainer is high, a possibility that a group of noodle strings floats without adhering to the bottom of the retainer is increased. It is presumed that the noodle lump enters the state (2) when the noodle lump floats before fixing the shape of the noodle lump, and that a noodle lump enters the state (4) when the noodle lump floats after insufficiently fixing the shape of the noodle lump.

In Comparative Example 1, a proportion of a noodle lump in the state (2) in which the noodle strings were coarsely or densely distributed was 100%. This is probably for the following reason: since the retainer is dipped in the heated frying oil at a time in the prior art, the noodle strings float when moisture contained in the noodle strings evaporates, the upper side becomes flat because it comes into close contact with the lid, and thus a noodle lump having a dense upper portion and a coarse lower portion is shaped.

Experiment 2

In Experiment 2, under conditions where the dipping ratio of the retainer in the half frying of the present invention was set to 35% (corresponding to the dipping ratio of a group of noodle strings of 29.75%), with the flow rate ratio between the upstream portion and the downstream portion of the frying oil supplied through the ejection ports disposed in the upstream portion and the downstream portion of the frying oil tank changed in a stepwise manner from 45.3% to 100%, noodle lumps were prepared at the respective flow rate ratios (Examples 2-1 to 2-6). The dipping ratio of the retainer of 35% corresponds to the dipping ratio of the retainer employed in Example 1-2 of Experiment 1 in which a noodle lump in the state (1) in which the noodle strings were homogeneously distributed without coarseness and denseness as illustrated in FIG. 5(1) could be obtained in the most samples.

It is noted that the other conditions were the same as those of Experiment 1 unless otherwise specified.

Example 2-1

In Example 2-1, the valves 89 were controlled so that the average flow rate of the frying oil supplied through the first ejection port and the second ejection port provided in the upstream portion of the frying oil tank could be 39 m³/h and that the average flow rate of the frying oil supplied through the third ejection port and the fourth ejection port provided in the downstream portion of the frying oil tank could be 86 m³/h, namely, the flow rate ratio between the upstream portion and the downstream portion could be 45.3%. The other conditions were the same as those employed in Example 1-2.

Example 2-2

In Example 2-2, a fried noodle lump was prepared under the same conditions as in Example 2-1 except that the average flow rate of the frying oil supplied through the first ejection port and the second ejection port provided in the upstream portion of the frying oil tank was set to 52 m³/h and that the average flow rate of the frying oil supplied through the third ejection port and the fourth ejection port provided in the downstream portion of the frying oil tank was set to 73 m³/h, namely, the flow rate ratio between the upstream portion and the downstream portion was set to 71.2%. All the conditions employed in Example 2-2 were the same as those employed in Example 1-2.

Example 2-3

A fried noodle lump was prepared under the same conditions as in Example 2-1 except that the average flow rate of the frying oil supplied through the first ejection port and the second ejection port provided in the upstream portion of the frying oil tank was set to 57 m³/h and that the average flow rate of the frying oil supplied through the third ejection port and the fourth ejection port provided in the downstream portion of the frying oil tank was set to 68 m³/h, namely, the flow rate ratio between the upstream portion and the downstream portion was set to 83.8%.

Example 2-4

A fried noodle lump was prepared under the same conditions as in Example 2-1 except that the average flow rate of the frying oil supplied through the first ejection port and the second ejection port provided in the upstream portion of the frying oil tank was set to 60 m³/h and that the average flow rate of the frying oil supplied through the third ejection port and the fourth ejection port provided in the downstream portion of the frying oil tank was set to 65 m³/h, namely, the flow rate ratio between the upstream portion and the downstream portion was set to 92.3%.

Example 2-5

A fried noodle lump was prepared under the same conditions as in Example 2-1 except that the average flow rate of the frying oil supplied through the first ejection port and the second ejection port provided in the upstream portion of the frying oil tank was set to 62 m³/h and that the average flow rate of the frying oil supplied through the third ejection port and the fourth ejection port provided in the downstream portion of the frying oil tank was set to 63 m³/h, namely, the flow rate ratio between the upstream portion and the downstream portion was set to 98.4%.

Example 2-6

A fried noodle lump was prepared under the same conditions as in Example 2-1 except that the supply amount of the frying oil supplied to the frying oil tank was controlled so that all the average flow rates of the frying oil supplied through the first ejection port to the fourth ejection port could be 62.5 m³/h, namely, the flow rate ratio between the upstream portion and the downstream portion could be 100%.

<Evaluation Results of Experiment 2>

The states of the noodle lump samples experimentally produced in Experiment 2 were divided, in the same manner as in Experiment 1, into the state (1) in which noodle strings were homogeneously distributed without coarseness and denseness, the state (2) in which noodle strings were coarsely or densely distributed, the state (3) in which a density of noodle strings was lower in the center of the noodle lump, and the state (4) in which the noodle lump had underside slide (inclination), and the number of each state was counted to express the number in percentage as shown in Table 2. Besides, the result of Comparative Example 1 obtained in Experiment 1 is also shown in Table 2.

TABLE 2

| | Flow Rate [m³/h] | | | | | Flow | | | | |
| | First Ejection Port | Second Ejection Port | Third Ejection Port | Fourth Ejection Port | Total Flow Rate | Rate Ratio | State of Noodle Lump | | | |
| Example | | | | | Rate | (%) | (1) | (2) | (3) | (4) |
|---|---|---|---|---|---|---|---|---|---|---|
| Example 2-1 | 39 | 39 | 86 | 86 | 250 | 45.3% | 80% | 0% | 15% | 5% |
| Example 2-2 | 52 | 52 | 73 | 73 | 250 | 71.2% | 90% | 2% | 4% | 4% |
| Example 2-3 | 57 | 57 | 68 | 68 | 250 | 83.8% | 85% | 5% | 5% | 5% |
| Example 2-4 | 60 | 60 | 65 | 65 | 250 | 92.3% | 40% | 20% | 10% | 30% |
| Example 2-5 | 62 | 62 | 63 | 63 | 250 | 98.4% | 0% | 10% | 10% | 80% |
| Example 2-6 | 62.5 | 62.5 | 62.5 | 62.5 | 250 | 100.0% | 0% | 5% | 5% | 90% |
| Comparative Example 1 | 62.5 | 62.5 | 62.5 | 62.5 | 250 | 100.0% | 0% | 100% | 0% | 0% |

A noodle lump in the state (1) in which the noodle strings were homogeneously distributed without coarseness and denseness could be obtained in the largest number of samples in Example 2-2, and the proportion was 90%. On the other hand, as the flow rate ratio [%] between the upstream portion and the downstream portion of the frying oil was larger, the proportion of noodle lump samples in the state (1) was reduced, and was 0% in Examples 2-5 and 2-6 in which the flow rate ratio exceeded 95% while a proportion of noodle lump samples in the state (4) in which the noodle lump had underside slide (inclination) was 80% or more. This is probably for the following reason: as the flow rate ratio between the upstream portion and the downstream portion of the frying oil is increased, namely, as the average flow rate of the frying oil supplied to the upstream portion of the frying oil tank is larger than in the downstream portion, a noodle lump peels off and floats from the bottom of the cup container by resistance caused by the flow of the frying oil before fixing the shape, and collides against the retainer lid. Therefore, the ratio of the flow rates of the frying oil supplied to the upstream portion and the downstream portion of the frying oil tank is 90% or less, and preferably 85% or less.

On the other hand, when the average flow rate of the frying oil supplied to the upstream portion of the frying oil tank is too low, the temperature of the frying oil is lowered, and there is a possibility that a noodle lump may be insufficiently fried. Therefore, the flow rate ratio between the upstream portion and the downstream portion of the frying oil is at least 30% or more, and preferably 40% or more.

Experiment 3

Five samples were arbitrarily selected respectively from the noodle lumps in the state of FIG. 5(1) obtained in Example 2-2 and the noodle lumps in the state of FIG. 5(2) obtained in Comparative Example 1, and a lateral cross section and a vertical cross section of each of the selected samples were imaged using a microfocus X-ray fluoroscopy CT system (manufactured by Tesco Inc., TXS225) under conditions shown in Table 3.

TABLE 3

| Conditions for imaging | |
|---|---|
| X-ray Source [kV] | 225 |
| Tube Voltage [kV] | 180 |
| Tube Current [mA] | 0.15 |
| Size of Detector [inch] | FlatPanel |
| SID[mm] | 1000 |
| SOD[mm] | 711 |
| Size of View Field [mm] | 179 |

TABLE 3-continued

| Conditions for imaging | |
|---|---|
| Magnification | 1.4 |
| Size of Pixel [mm] | 0.1 |

Figure 7:
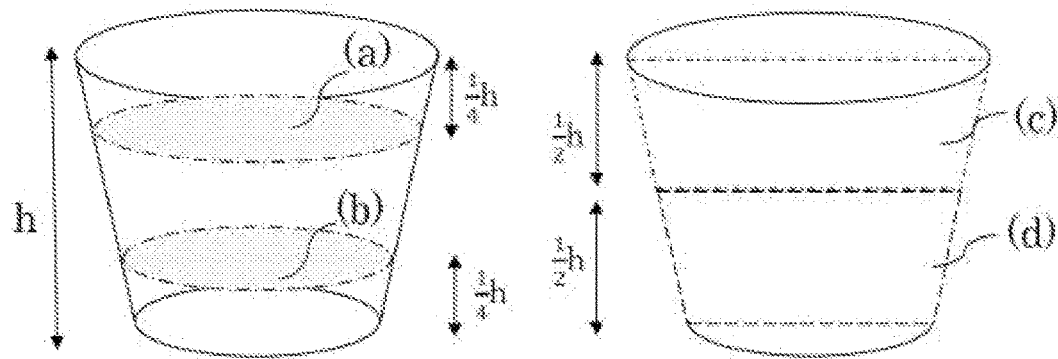
FIG. 7 is a schematic diagram illustrating positions of regions (a) and (b) corresponding to lateral cross sections of a fried noodle lump and regions (c) and (d) corresponding to vertical cross sections thereof to be imaged by microfocus X-ray fluoroscopy CT.

FIG. 7 is a schematic diagram illustrating positions of cross sectional regions (a), (b), (c) and (d) of a noodle lump imaged by the microfocus X-ray fluoroscopy CT system, in which h represents a height of the noodle lump. The region (a) corresponds to a lateral cross section passing through the center of an upper portion of the noodle lump, and is positioned at a distance of h/4 from an upper side portion of the noodle lump. The region (b) corresponds to a lateral cross section passing through the center of a lower portion of the noodle lump, and is positioned at a distance of h/4 from an underside portion of the noodle lump. Besides, the region (c) corresponds to an upper portion of a vertical cross section passing through the center of the noodle lump, and the region (d) corresponds to a lower portion of the vertical cross section passing through the center of the noodle lump.

Figure 8:
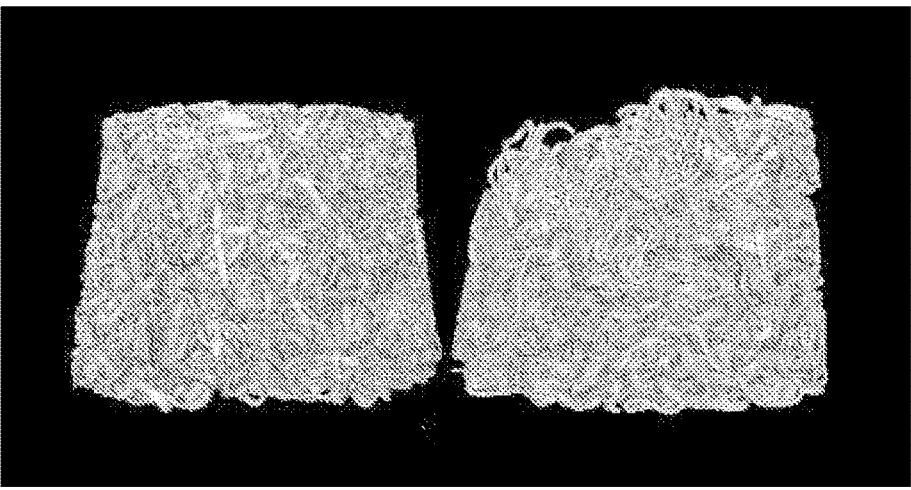
FIG. 8 illustrates photographs of appearances of fried noodle lumps imaged by the microfocus X-ray fluoroscopy CT (left: the present invention, right: conventional technique).
Figure 9:
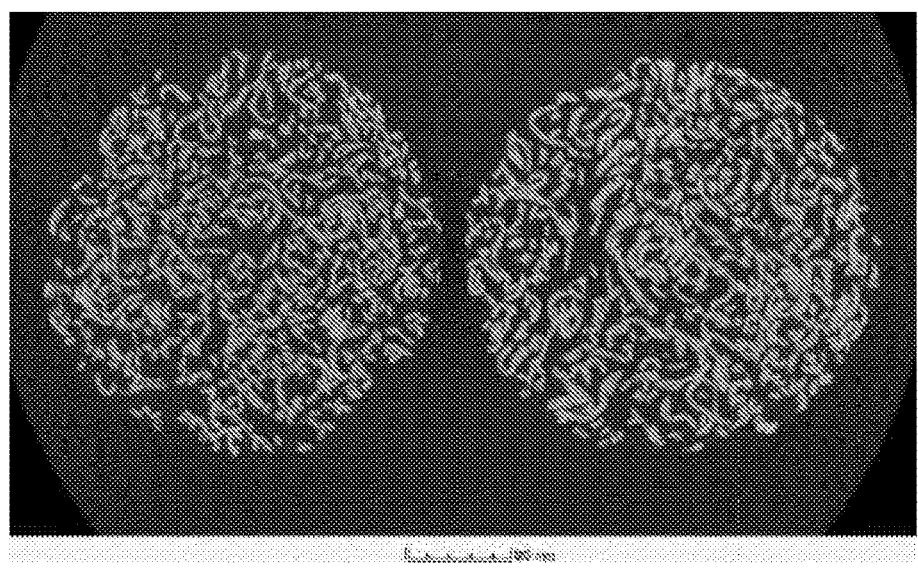
FIG. 9 illustrates a photograph of lateral cross sections of the region (a) of fried noodle lumps imaged by the microfocus X-ray fluoroscopy CT (left: the present invention, right: conventional technique).
Figure 10:
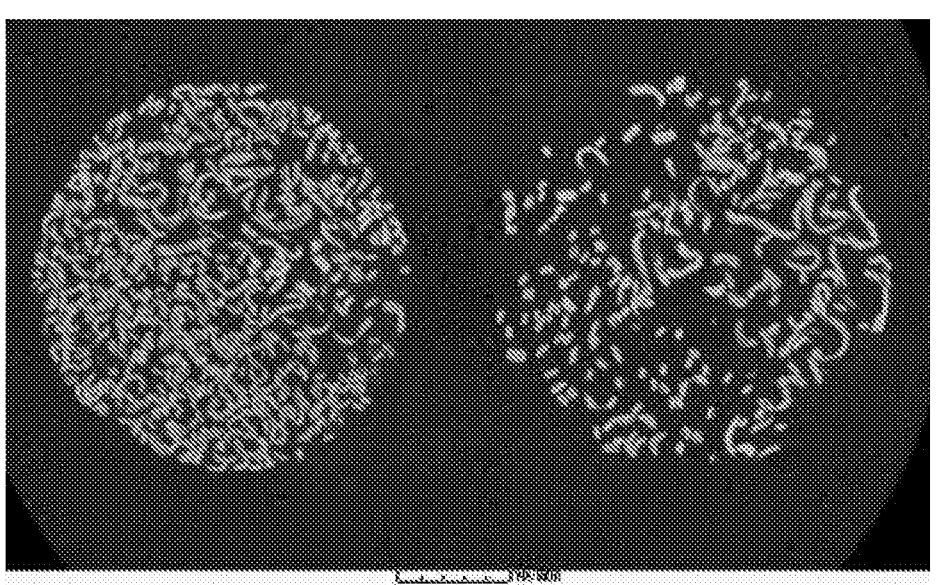
FIG. 10 illustrates a photograph of lateral cross sections of the region (b) of fried noodle lumps imaged by the microfocus X-ray fluoroscopy CT (left: the present invention, right: conventional technique).
Figure 11:
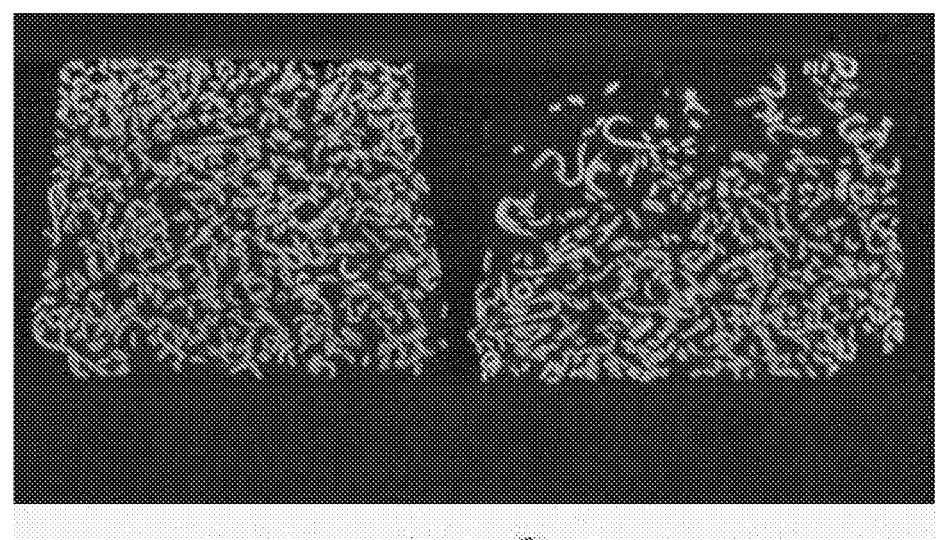
FIG. 11 illustrates a photograph of vertical cross sections including the regions (c) and (d) of fried noodle lumps imaged by the microfocus X-ray fluoroscopy CT (left: the present invention, right: conventional technique).

FIG. 8 illustrates an exemplified photograph of appearances of the fried noodle lumps imaged by the microfocus X-ray fluoroscopy CT (left: the present invention, right: conventional technique). Besides, FIG. 9 illustrates an exemplified photograph of the region (a) corresponding to the lateral cross section of the fried noodle lump, FIG. 10 illustrates an exemplified photograph of the region (b) corresponding to the lateral cross section of the fried noodle lump, and FIG. 11 illustrates exemplified photographs of the regions (c) and (d) corresponding to the vertical cross sections of the fried noodle lump all imaged by the microfocus X-ray fluoroscopy CT (left: the present invention, right: conventional technique). Since the noodle lump illustrated in FIG. 7 is inverted for imaging, the upper side portion faces downward, and the underside portion faces upward in FIGS. 8 to 11.

Then, the images of the cross sections of the noodle lumps obtained as illustrated in FIGS. 9 to 11 were analyzed using Image-Pro Premier 9.1 manufactured by Media Cybernetics to obtain densities of the noodle strings in the cross sections of the fried noodle lumps. Specifically, areas of the regions (a) and (b) corresponding to the lateral cross sections and the regions (c) and (d) corresponding to the vertical cross sections, and a total area of the group of noodle strings present in each of the cross sections were obtained, and a ratio occupied by the group of noodle strings in each region, namely, a density [%] of the noodle strings, was measured. Then, an absolute value of a difference in the density of the noodle strings between the regions (a) and (b), and an absolute value of a difference in the density of the noodle strings between the regions (c) and (d) were obtained. Table 4 shows analysis results of the noodle lumps obtained in Example 2-2, and Table 5 shows analysis results of the noodle lumps obtained in Comparative Example 1.

TABLE 4

| | Sample 1 | Sample 2 | Sample 3 | Sample 4 | Sample 5 | Average | Standard deviation | +2σ | −2σ |
|---|---|---|---|---|---|---|---|---|---|
| Noodle String Density in Region (a) | 33.2% | 37.1% | 38.9% | 40.9% | 42.0% | 38.4% | 3.1% | 44.6% | 32.2% |
| Noodle String Density in Region (b) | 30.3% | 31.4% | 29.5% | 30.8% | 33.3% | 31.1% | 1.3% | 33.6% | 28.5% |
| Difference in Noodle String Density between Regions (a) and (b) | 2.9% | 5.7% | 9.4% | 10.1% | 8.6% | 7.3% | 2.7% | 12.8% | 1.9% |
| Noodle Density in Region (c) | 33.6% | 31.8% | 36.6% | 41.7% | 41.2% | 37.0% | 4.0% | 44.9% | 29.0% |
| Noodle Density in Region (d) | 33.2% | 31.5% | 31.7% | 32.8% | 35.8% | 33.0% | 1.6% | 36.1% | 29.9% |
| Difference in Noodle String Density between Regions (c) and (d) | 0.4% | 0.3% | 4.9% | 8.9% | 5.4% | 4.0% | 3.3% | 10.5% | −2.6% |

TABLE 5

| | Sample 6 | Sample 7 | Sample 8 | Sample 9 | Sample 10 | Average | Standard deviation | +2σ | −2σ |
|---|---|---|---|---|---|---|---|---|---|
| Noodle Density in Region (a) | 37.1% | 38.0% | 37.6% | 38.4% | 41.9% | 38.6% | 1.7% | 42.0% | 35.2% |
| Noodle Density in Region (b) | 22.5% | 22.3% | 22.5% | 22.6% | 25.4% | 23.1% | 1.2% | 25.4% | 20.7% |
| Difference in Noodle String Density between Regions (a) and (b) | 14.5% | 15.7% | 15.2% | 15.8% | 16.5% | 15.5% | 0.7% | 16.9% | 14.2% |
| Noodle Density in Region (c) | 36.4% | 37.1% | 38.8% | 41.3% | 39.5% | 38.6% | 1.8% | 42.1% | 35.1% |
| Noodle Density in Region (d) | 21.9% | 19.0% | 19.8% | 19.7% | 21.4% | 20.4% | 1.1% | 22.5% | 18.2% |
| Difference in Noodle String Density between Regions (c) and (d) | 14.5% | 18.1% | 18.9% | 21.6% | 18.2% | 18.3% | 2.3% | 22.8% | 13.7% |

In the noodle lumps prepared in Example 2-2, the difference in the density of the noodle strings between the upper portion and the lower portion is small, and the difference is 2.9% to 10.1% (average: 7.3%, standard deviation: 2.7%) between the regions (a) and (b) corresponding to the lateral cross sections, and is 0.3% to 8.9% (average: 4.0%, standard deviation: 3.3%) between the regions (c) and (d) corresponding to the vertical cross sections.

On the other hand, in the noodle lumps prepared in Comparative Example 1, the difference in the density of the noodle strings between the upper portion and the lower portion of the noodle lump is large, and the difference is 14.5% to 16.5% (average: 15.5%, standard deviation: 0.7%) between the regions (a) and (b) corresponding to the lateral cross sections, and is 14.5% to 21.6% (average: 18.3%, standard deviation: 2.3%) between the regions (c) and (d) corresponding to the vertical cross sections.

In this manner, when the noodle lumps prepared in Example 2-2 and Comparative Example 1 are compared, the difference in the density of the noodle strings between the upper portion and the lower portion of the noodle lump is largely different, and it is understood that a fried noodle lump that has a very small difference in the density of noodle strings between an upper portion and a lower portion, and is homogeneously fried can be obtained in the present invention.

From the viewpoints of the frying efficiency and the appearance of the noodle lump, the difference in the density of noodle strings between the upper portion and the lower portion of the fried noodle lump is preferably small. Specifically, the difference in the density of noodle strings between the upper portion and the lower portion of the noodle lump is at least 13% or less, and preferably 11% or less.

As described so far, in the present invention, the frying is performed in the two stages of the half frying and the deep frying, and in addition, the flow rate of the frying oil and the surface level are controlled, and therefore, a noodle lump that has a very small difference in the density of noodle strings between an upper portion and a lower portion and is homogeneously fried can be efficiently mass produced.

REFERENCE SIGNS LIST 1 frying oil tank
11 suction port
12 first ejection port
13 second ejection port
14 third ejection port
15 fourth ejection port
16a, 16b first frying oil supplying pipe
17a, 17b second frying oil supplying pipe 18*a*, 18*b* third frying oil supplying pipe
19*a*, 19*b* fourth frying oil supplying pipe
2 frying oil
    21 surface level
3 retainer conveyor
    31 retainer
    32 conveyance chain (for retainer conveyor)
    33 sprocket (for retainer conveyor)
    34 sprocket (for retainer conveyor)
4 retainer lid conveyor
    41 retainer lid
    42 conveyance chain (for retainer lid conveyor)
    43 sprocket (for retainer lid conveyor)
    44 sprocket (for retainer lid conveyor)
5 noodle string supplying mechanism
6 extension plate
    61 hole
7 surface level sensor
8 frying oil circulating mechanism
    80 proportional valve
81 heat exchanger
    82 fresh oil tank
    83 frying oil common supplying pipe
    84 strainer
    85 fresh oil supplying pipe
    86 heat exchanger frying oil recovering pipe
87 heat exchanger frying oil supplying pipe
    88 pump device
89 valve
9 group of noodle strings

The invention claimed is:

1. An apparatus for producing a fried noodle lump, comprising:

a frying oil tank;

a noodle string supplying mechanism disposed upstream from the frying oil tank, and charging a group of noodle strings to a retainer;

a noodle string group frying and conveying mechanism conveying the group of noodle strings with the retainer partly dipped in frying oil in a first region of the frying oil tank, and subsequently conveying the group of noodle strings with the retainer dipped below a surface level of the frying oil in a second region of the frying oil tank;

a frying oil circulating mechanism recovering the frying oil from the frying oil tank and supplying the frying oil heated again to the frying oil tank; and a frying oil flow rate controlling mechanism controlling flow rates of the frying oil supplied through a plurality of ejection ports provided in the frying oil tank, wherein a flow rate of the frying oil supplied through an ejection port provided in an upstream portion of the frying oil tank is controlled to be smaller than a flow rate of the frying oil supplied through an ejection port provided in a downstream portion, wherein the frying oil tank comprises:

a suction port recovering the frying oil to the frying oil container mechanism; and a extension plate disposed in at least one of the plurality of ejections ports for preventing the frying oil flowing in from directly hitting the retainer.

2. The apparatus for producing a fried noodle lump according to claim 1, further comprising a surface level sensor measuring the surface level of the frying oil in the first region.

3. The apparatus for producing a fried noodle lump according to claim 2, further comprising a fresh oil supplying mechanism controlling a supply amount of a fresh oil to be supplied to the frying oil circulating mechanism based on the surface level of the frying oil measured by the surface level sensor.

* * * * *